United States Patent [19]
Juros

[11] Patent Number: 5,081,769
[45] Date of Patent: Jan. 21, 1992

[54] CUTTER HEAD WITH FLEXIBLE STABILIZER

[75] Inventor: Karel B. F. Juros, Statesboro, Ga.

[73] Assignee: Cooper-Industries, Inc., Houston, Tex.

[21] Appl. No.: 439,593

[22] Filed: Nov. 20, 1989

[51] Int. Cl.⁵ .............................................. B26B 13/00
[52] U.S. Cl. ........................................ 30/261; 30/234; 30/254
[58] Field of Search ................ 30/234, 252, 254–262, 30/268, 269, 191–193

[56] References Cited
U.S. PATENT DOCUMENTS

| | | | |
|---|---|---|---|
| 1,181,637 | 5/1916 | Boye | 30/268 |
| 2,142,738 | 1/1939 | Wakeley | 30/234 X |
| 2,741,841 | 4/1956 | Egeth | 30/235 X |

Primary Examiner—Douglas D. Watts
Attorney, Agent, or Firm—David A. Rose

[57] ABSTRACT

Disclosed is a cutting head, suitable for use in cutting wire or sheet metal. The cutting head includes two jaws, and a cutting blade on each jaw. A spring, which is preferably a split cylinder, is disposed in a hole at the pivot point between the jaws. The spring expands in the hole, forces the jaws apart, and stabilizes the jaws during use while correcting for any minor deviations which occurred in machining of the functional parts of the cutting head. In a preferred embodiment, the two jaws are held together by one or more straps which are bolted to each of the jaws.

13 Claims, 3 Drawing Sheets

CUTTER HEAD WITH FLEXIBLE STABILIZER

FIELD OF THE INVENTION

The invention relates to a cutting head to be used, for example, in wire cutters or sheet metal cutters, wherein a spring at the pivot between the jaws applies an outward force on the jaws and thereby stabilizes movement of the jaws.

BACKGROUND OF THE INVENTION

Cutting heads, such as those used in wire or sheet metal cutters, are essentially composed of two jaws pivotally attached to each other. A cutting blade is located on the inner portion of each jaw. The object to be cut is positioned between the jaws, in the cutting blade section, and the jaws are pivoted towards each other to cut the object.

In one known jaw assembly, the jaws pivot around a pin located in a hole at a central pivot point, and are held together by straps which are bolted to either side of each jaw. See FIG. 1. Alternatively, jaws held together by straps can pivot around a set of mating gears, as shown in FIG. 2.

The disadvantage of such arrangements is that the jaws tend to be unstable, because of tolerance between the pivot hole and the pivot pin, or because of tolerance in the gears. It should be noted that the size of the pivot hole, or the clearance between the gears, changes as the jaws are pivoted. This leads to additional instability unless the pivot hole, or the gears, are precisely machined. In addition, imprecision in the machining of the straps or the holes in the straps will change the distance between the jaws. This leads to further instability at the pivot, because changing the distance between the jaws changes the way the pin fits into the hole, or the clearance between the gears.

Instability at the pivot can lead to undesired wobble of the jaws about the pivot axis and an irregular cut. While more precise machining will prevent such instability, it leads to increases in cost. Thus, what is needed is a system which can stabilize the jaws in a cutting head without requiring high tolerance machining and the concomitant increased costs.

SUMMARY OF THE INVENTION

The invention includes a spring which is designed to sit at the pivot point between the jaws of a cutting head and apply an outward force on the jaws. The spring is preferably of a split cylindrical shape and sits in a hole at the pivot point. The spring expands to the limits of the pivot hole and applies an outward force on the jaws, thereby reducing the wobble of the jaws about the pivot and stabilizing them during cutting.

In a preferred embodiment, the jaws are held together by one or more straps, each strap being bolted to both jaws. Handles can be attached to the cutting head, on the opposite side of the pivot from the cutting blades, to allow greater torque to be applied to the jaws. The invention can be understood more clearly with reference to the drawings and detailed description which follows.

DETAILED DESCRIPTION OF THE INVENTION

Figure 3:
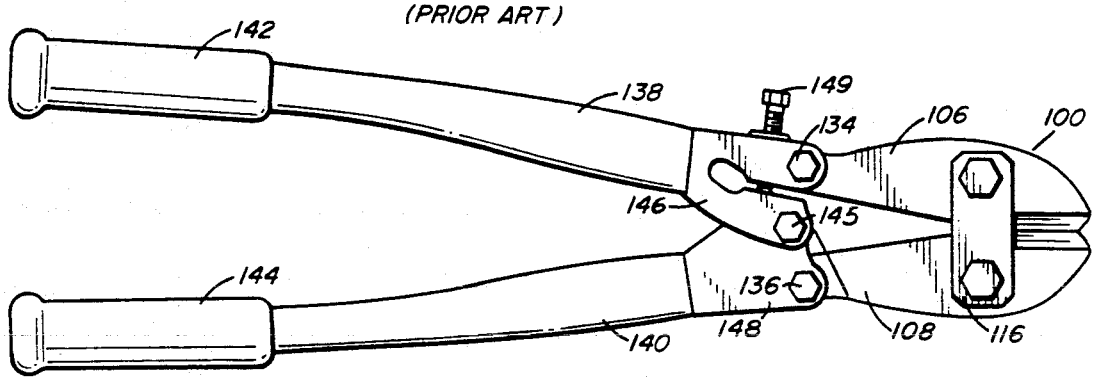
FIG. 3 is a top plan view of cutters which include the cutting head of the invention.
Figure 4:
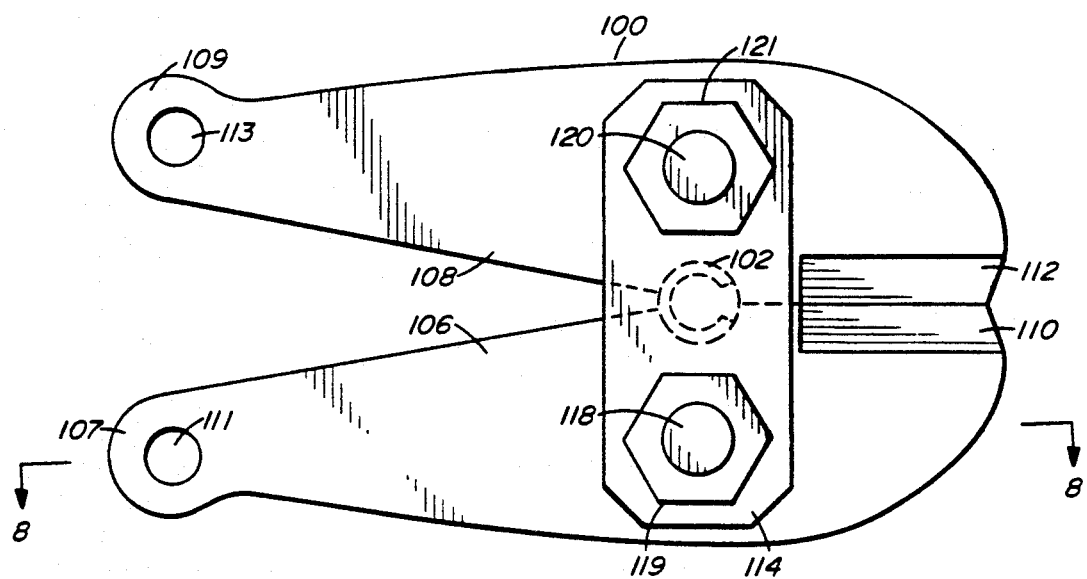
FIG. 4 is a top plan view, partially in transparency, of the cutting head of the invention.

Referring first to FIG. 3, a conventional set of wire or sheet metal cutters which include a cutting head 100 of the invention is shown. The cutting head 100 has jaws 106, 108. Referring now to FIG. 4, holes 111, 113, are disposed at ends 107, 109 of jaws 106, 108, respectively. Holes 111, 113 are designed to accommodate bolts 134, 136, respectively. Bolts 134, 136 attach jaws 106, 108 to handles 138, 140, respectively, as shown in FIG. 3. Handles 138, 140 allow an operator to provide more torque, which may be needed to open and close jaws 106, 108, if cutting materials which are thick, strong or difficult to sever. At the ends of handles 138, 140 are protectors 142, 144, respectively, designed to provide a more comfortable gripping surface for the operator.

Each handle 138, 140 has an inwardly extending plate portion 146, 148, respectively, at the end of the handles opposite from that on which protectors 142, 144 are disposed. Inwardly extending plate portion 146 overlaps plate portion 148, and is joined thereto with a bolt 145 which extends through portions 146, 148. An adjusting screw 149 projects through the side of handle 138, underneath plate portion 146, and abuts the edge of plate portion 148. Adjusting screw 149 prevents inward movement of ends 107, 109 past the point where portion 148 abuts the end of screw 149.

Figure 1:
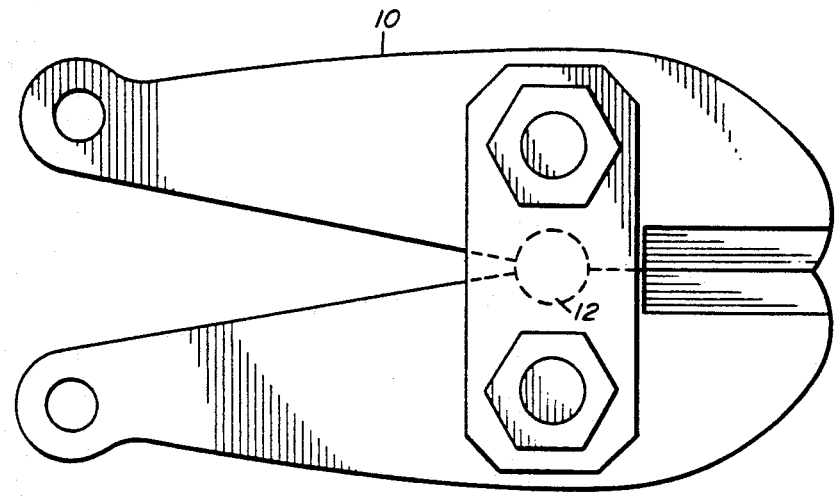
FIG. 1 is a top plan view, partially in transparency, of a known cutting head having a pin in the pivot hole between the jaws.
Figure 2:
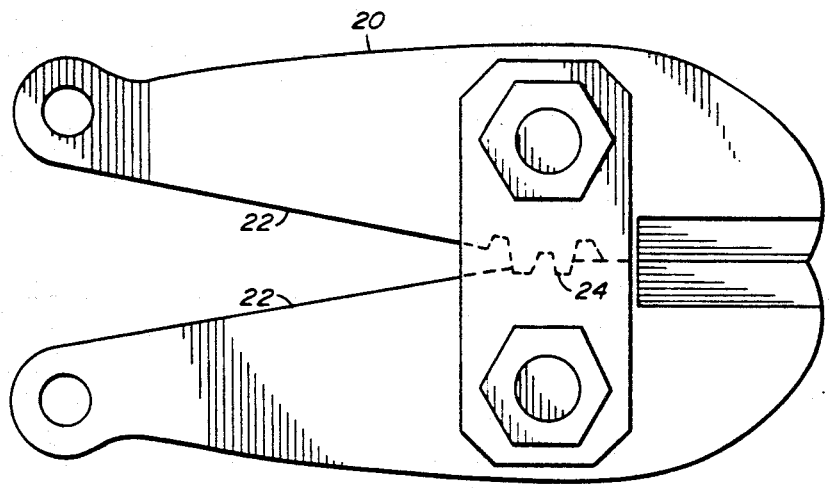
FIG. 2 is top plan view, partially in transparency, of a known cutting head having gears at the pivot between the jaws.

Referring to FIGS. 1 and 2, two different types of known cutting heads are shown, which can be attached to the conventional cutters of FIG. 3. The cutting head 10 of FIG. 1 has a pin 12 in a hole at the pivot. In the cutting head 20 of FIG. 2, the jaws 22 pivot about a set of gears 24. As noted above, instability will often result when cutting with either cutting head 10 or cutting head 20 due to changes in the dimensions at the pivot point upon pivoting of the jaws, or due to imprecise machining of the cutting heads, both of which lead to wobble of the jaws.

Figure 5:
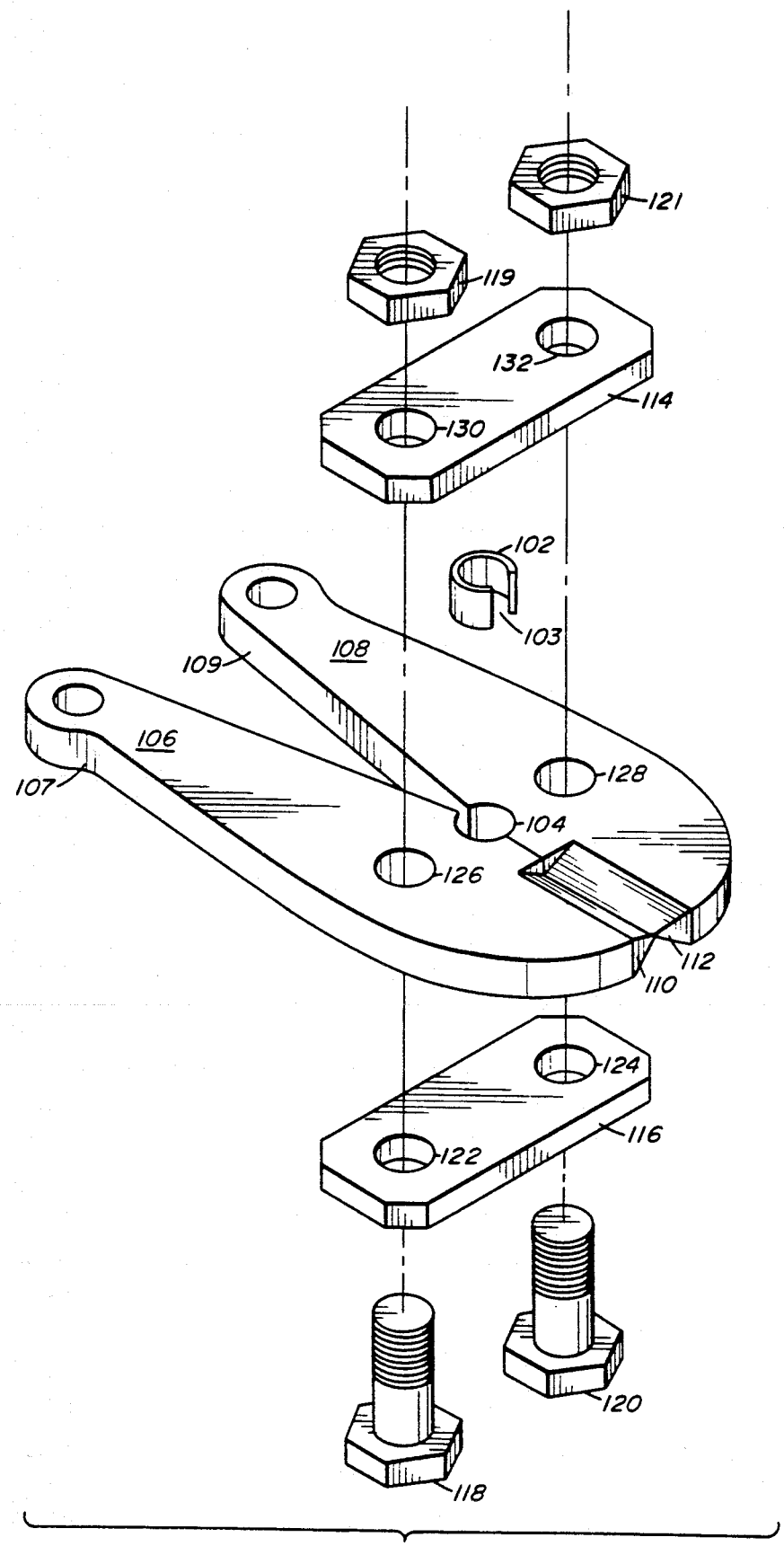
FIG. 5 is an exploded view of the cutting head of the invention.

Referring to FIGS. 4 and 5, a cutting head 100 of the invention is shown. Cutting head 100 is preferably made of steel or an alloy with sufficient hardness to be suitable for cutting metal. Cutting head 100 has a cylindrical spring 102, C-shaped in cross-section, with an axial gap 103. Spring 102 is preferably made of a resilient metal and is located in a hole 104 at the pivot point between jaws 106, 108. Spring 102 is designed to expand outwardly in hole 104 to the limits of the hole thereby exerting an outward force on jaws 106, 108. This inhibits wobble or movement of jaws 106 in a plane other than the plane in which the jaws are designed to pivot.

Cutting head 100 has cutting blades 110, 112, respectively, associated with the jaws 106, 108. The cutting blades 110, 112 are both located on the same side of hole 104. Jaws 106, 108 are held together by upper and lower straps 114, 116, which are respectively located above and below the surfaces of the jaws. Straps 114, 116 are secured to jaws 106, 108 by bolts 118, 120. Bolts 118, 120 extend through holes 122, 124 in lower strap 116, holes 126, 128 in jaws 106, 108, respectively, and holes 130, 132 in upper strap 114. Bolts 118, 120 are secured in place by nuts 119, 121, respectively. The center line of bolts 118, 120 passes through hole 104.

Ends 107, 109, respectively, of jaws 106, 108, are located on the side of hole 104 opposite that on which cutting blades 110, 112 are located. Ends 107, 109 taper away from each other. Moving ends 107, 109 towards each other causes the cutting blades 110, 112 to open.

The operation of cutting head 100 will now be described. Referring to the preferred cutters shown in FIG. 3, the operator grasps the protected portions of handles 138, 140 with both hands and opens the handles to open cutting blades 110, 112. Adjusting screw 149 limits the outward movement of cutting blades 110, 112, by preventing such outward movement past the point where the end of screw 149 abuts the edge of portion 148.

The object to be cut is then positioned between the blades. When the operator moves the handles towards each other, the jaws 106, 108 will pivot around hole 104, and also each jaw will pivot around the associated bolt 118, 120 to cause inward movement of cutting blades 110, 112 and cutting of the object. This cycle can be repeated as necessary to lengthen the cut. Because the cutting head 100 is primarily designed for cutting wire or sheet metal, the adjustment screw 148 is typically set to allow the cutting blades 110, 112 to open about ⅛ of an inch—the maximum conventional thickness of wire or sheet metal which can be cut.

Figure 6:
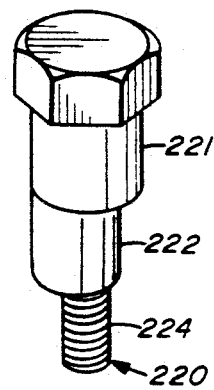
FIG. 6 is an enlarged isometric view from the side of an eccentric bolt suitable for use with the invention.
Figure 7:
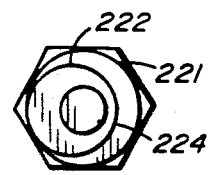
FIG. 7 is a bottom plan view of the bolt of FIG. 6.
Figure 8:
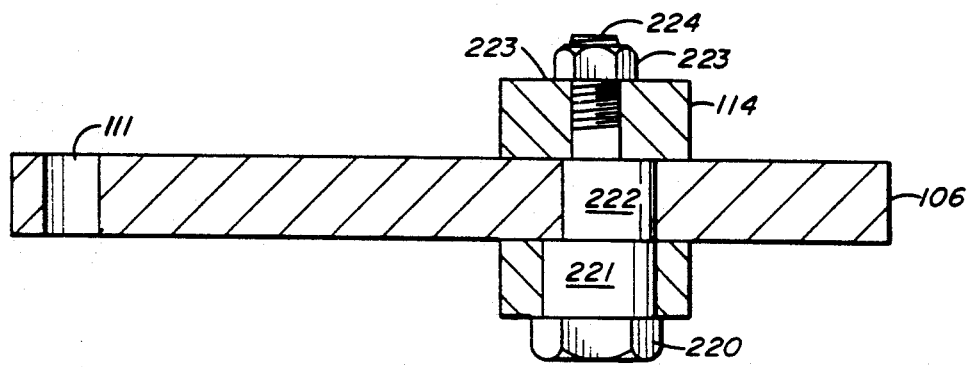
FIG. 8 is a sectional view, taken along the lines 8—8 of FIG. 4, but showing the eccentric bolt of FIGS. 6 and 7 in place in the preferred cutting head of the invention instead of the conventional bolt shown in FIG. 4.

Referring to FIGS. 6 and 7, the spring of the invention can also be used in a modified cutting head designed to allow adjustment of the position of the cutting edges so that they close together without leaving any gap between their edges. This can be accomplished, for example, by substituting bolts 118, 120 with bolts like bolt 220. The central portion 222 of bolt 220, i.e., the portion of the bolt which is accommodated in holes 126, 128 has a smaller outer diameter than the upper portion 221 of the bolt. The central portion 222 of the bolt is also set off- o center, or eccentrically, with respect to the upper and lower portions 221, 224, respectively, of the bolts. The central portions of the bolts are aligned in the holes 126, 128 forwardly of the line through the central axis of both holes. Referring to FIG. 8, the central portions of the bolts 220 would preferably be aligned so that they are as close as possible to the front of cutting head 100 where the blades are disposed, as shown. The bolts are locked at or near this position with a nut 223 which is threaded to the lower portion 224. Lower portion 224 has a smaller outside diameter than central portion 222 but is concentric with upper portion 221 Other eccentric bolts can also be designed to allow such adjustment of the closed position of the cutting edges, and the spring of the invention can be used with any such bolt.

It should be understood that the foregoing terms, expressions, and embodiments are exemplary only and not limiting, and that the scope of protection is defined only in the claims which follow and includes all equivalents of the subject matter of those claims.

What is claimed is:

1. A cutting head assembly including two jaws, a cutting blade on each jaw, and a pivot point between the jaws, the improvement comprising:
   a spring positioned between the jaws and extending around the pivot point; said spring being rigid in a direction parallel to the axis of rotation about the pivot point and engaging each of the jaws, said spring exerting an outward pivoting force on the jaws about the axis of the pivot point toward an open position and resisting the movement of the jaws in a plane other than the pivot plane.

2. A cutting head assembly including two jaws, a cutting blade on each jaw, and a pivot point between the jaws, comprising:
   a spring in the shape of a split cylinder being positioned between the jaws and surrounding the pivot point, said spring exerting an outward force on the jaws.

3. The cutting head assembly of claim 2 wherein the two jaws are held together by at least one strap which is bolted to each of the jaws.

4. The cutting head assembly of claim 3 wherein the cutting blades are both located on a first side of the pivot point.

5. The cutting head assembly of claim 4 wherein the jaws taper away from each other on a second side of the pivot point opposite the first side, and the cutting blades can be pivoted by movement of the jaws on the second side of the pivot point.

6. The cutting head assembly of claim 5 further including a handle means attached to said second side for increasing the torque closing the jaws.

7. Wire or sheet metal cutters having mating cutting blades, said cutters being stabilized so as to prevent the cutting blades from undesired movement, comprising:
   two jaws, a cutting blade on each jaw, and a pivot point between the jaws; and
   a C-shaped spring made of spring steel and forming a rigid wall extending in a direction parallel to the axis of rotation; said spring extending around the pivot point in engagement with said jaws to exert an outward force on the jaws and resist movement of said jaws in a plane other than the pivot plane.

8. Wire or sheet metal cutters having mating cutting blades, said cutters being stabilized so as to prevent the cutting blades from undesired movement, comprising:
   two jaws, a cutting blade on each jaw, and a pivot point between the jaws; and
   a spring in the shape of a split cylinder accommodated between the jaws and about the pivot point which exerts an outward force on the jaws.

9. Wire or sheet metal cutters having mating cutting blades, said cutters being stabilized so as to prevent the cutting blades from undesired movement comprising:
   two jaws, a cutting blade on each jaw, and a pivot point between the jaws;
   a spring extending around the pivot point which exerts an outward force on the jaws; and
   at least one strap bolted to the jaws to hold them together.

10. A cutting head assembly comprising:
    first and second jaws each having a cutting blade;
    said jaws having a pivot point whereby said jaws can pivot to an open position with said cutting blades apart and to a closed position with said cutting blades in cutting engagement;

a spring having a surface extending in a direction parallel to the axis of rotation about the pivot point, said surface being in contact with said jaws to prevent said jaws from moving in a direction other than around the pivot point, said spring being disposed around said pivot point and in engagement with said jaws to bias said jaws toward said open position.

11. The cutting head assembly of claim 10 wherein said jaws have arcuate recesses adjacent said pivot point housing said spring.

12. A cutting head assembly comprising:
first and second jaws each having a cutting blade;
said jaws having a pivot point whereby said jaws can pivot to an open position with said cutting blades apart and to a closed position with said cutting blades in cutting engagement;
a spring disposed around said pivot point and in engagement with said jaws to bias said jaws toward said open positions;
said jaws having arcuate recesses adjacent said pivot housing said spring; and
said spring having the shape of a split cylinder.

13. A cutting head assembly comprising:
first and second jaws each having a cutting blade;
said jaws having a pivot point with arcuate recesses around said pivot point;
first and second straps disposed over said pivot point on each side of said jaws;
a fastener having an eccentric central portion;
said fastener passing through aligned apertures in said straps and said eccentric central portion being disposed within said arcuate recesses.

* * * * *